United States Patent [19]

Besche et al.

[11] Patent Number: 4,707,203
[45] Date of Patent: Nov. 17, 1987

[54] METHOD OF PRODUCING HOSES WITH CONTRACTABLE INNER LININGS

[75] Inventors: Anton Besche, Korbach; Jost Österling, Waldeck-Höringhausen; Klaus Schwarze, Korbach, all of Fed. Rep. of Germany

[73] Assignee: Continental Gummi-Werke Aktiengesellschaft, Hanover, Fed. Rep. of Germany

[21] Appl. No.: 881,399

[22] Filed: Jul. 2, 1986

[30] Foreign Application Priority Data

Jul. 6, 1985 [DE] Fed. Rep. of Germany ....... 3524286

[51] Int. Cl.4 .................. B32B 31/00; B32B 31/26
[52] U.S. Cl. ......................... 156/85; 156/86; 156/149; 264/230; 264/342 R; 138/137
[58] Field of Search ............... 156/86, 143, 184, 188, 156/149, 84, 172, 187, 85; 264/342 R, 230; 138/137

[56] References Cited

U.S. PATENT DOCUMENTS 1,907,511 5/1933 Davies ......................... 264/230 X Primary Examiner—Donald E. Czaja
Assistant Examiner—Jeff H. Aftergut
Attorney, Agent, or Firm—Becker & Becker, Inc.

[57] ABSTRACT

To convey corrosive liquids, rubber hoses are customarily provided with an inner lining that is made of a synthetic material which is resistant to solvent. In order to achieve the previously unobtainable smooth, fold-free application of the thin plastic foil against the inner rubber layer of a hose, the present invention utilizes an extremely thin-walled contractible foil sleeve that is smoothly contracted upon a rigid fabrication mandrel. This foil sleeve then forms the base for the further build-up of the hose.

3 Claims, 3 Drawing Figures

METHOD OF PRODUCING HOSES WITH CONTRACTABLE INNER LININGS

BACKGROUND OF THE INVENTION

1. Field of the Invention

The present invention relates to a method of producing a hose of natural or synthetic rubber, whereby the hose has an inner surface or core made of a foil or thin sheet of thermoplastic synthetic material that is resistant to solvent. The method includes the steps of disposing a foil tube or sleeve on a fabrication mandrel, then building-up on the foil sleeve a hose blank, with or without a reinforcement layer, and subsequently vulcanizing the hose blank, which simultaneously produces a bond between the hose blank and the foil sleeve.

2. Description of the Prior Art

It is known, and has also for a long time been the customary practice, to provide rubber hoses with inner linings made of synthetic material that is resistant to solvent to thereby make the hose usable for conveying chemically corrosive liquids such as acids or bases, mineral oil or petroleum products, refrigerants, dyes, etc. The requirement for the chemical resistance of the inner lining is to a large extent taken into account by the appropriate selection of the synthetic material, for example polyamide, polyethylene, or a halogen-substituted hydrocarbon, whereas on the other hand the necessary resistance to pressure, flexibility, and other characteristics of the hose are achieved with elements known in the hose-manufacturing industry. In all cases, the incorporation into the hose structure of a synthetic-material inner core, which is comparable to a foreign body, has always created problems. Since the inner core, which is generally manufactured in tubular form by extrusion or is formed by bending or winding foils or strips, for manufacturing reasons always must have a certain minimum thickness, this inner core imparts to the finished hose a relatively high rigidity. Although this problem can be remedied somewhat by embodying the hose as a corrugated hose that has corrugations that extend in the circumferential direction or helically, such a configuration is often not desirable from the standpoint of flow dynamics. In addition to the generally poor conditions for a satisfactory secure bonding of the paired rubber and synthetic material, the tendency exists to form folds and even localized tears during the course of the build-up of the hose, and especially during the subsequent vulcanization, representing conditions that have proven to be particularly difficult to deal with. This always latent danger of encountering these conditions could up to now be prevented only by a compromise in the selection of thicker inner cores, which consequently also resulted in stiffer inner cores.

An object of the present invention, via the introduction of a novel method feature, is to provide the prerequisites for the manufacture of high-grade rubber hoses that have an extremely thin-walled inner core that is made of chemically resistant synthetic material and that has a completely smooth inner surface that will not form folds.

BRIEF DESCRIPTION OF THE DRAWING

This object, and other objects and advantages of the present invention, will appear more clearly from the following specification in conjunction with the schematic drawing, in which, to describe successive method steps.

SUMMARY OF THE INVENTION

The method of the present invention is characterized primarily by the use, as said foil sleeve, of a shrinkable or contractible foil tube or sleeve that has a diameter which is greater than the diameter of the fabrication mandrel, and that after the vulcanizing step forms a hose inner core that is free of folds and has a smooth surface.

The inventive foil sleeve can have a thickness that is in the range of from 0.2 to at most 0.1 mm (i.e. 20 to 100 microns); such a thickness was not practicable with the heretofore known foil sleeves. Under the effect of high temperature, the inventive foil sleeve is contracted upon the fabrication mandrel; the hose blank is thereupon built-up upon the foil sleeve, and is subsequently vulcanized.

The inventive method results in a multi-purpose, diffusion-resistant hose that has a completely smooth inner surface and has no folds or tears. Due to the unconventionally thin thickness of the foil of the inner core, the flexibility and vibration characteristics of the hose as a whole are practically those of a comparable hose that has no such inner core of synthetic material. The inventive manufacturing method is already simplified with the disposal of the over-dimensioned foil sleeve upon the rigid fabrication mandrel, whereas on the other hand there are no difficulties or even alterations for the customary hose build-up that follows the fold-free fixation of the foil sleeve. The very thin thickness of the foil sleeve moreover has an advantageous effect upon the bonding procedure.

DESCRIPTION OF PREFERRED EMBODIMENTS

Figure 1:
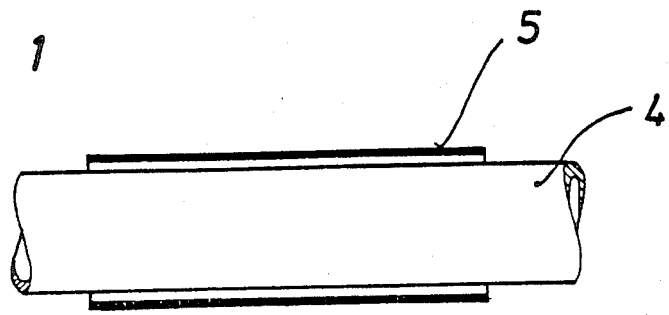
FIG. 1 is a partially cross-sectioned view showing a foil sleeve disposed about a fabrication mandrel.
Figure 2:
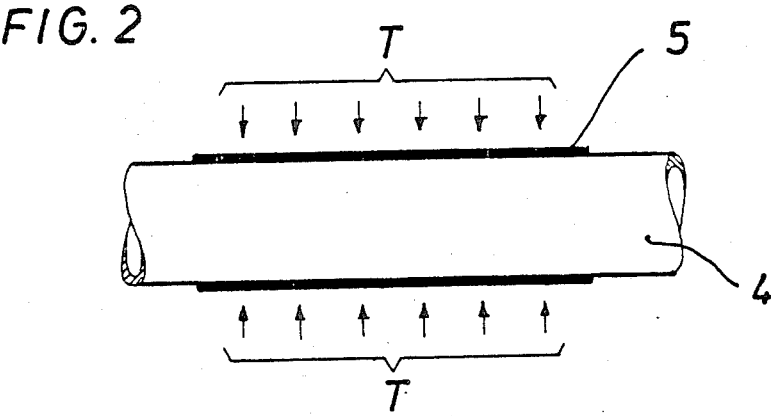
FIG. 2 is a view that shows the foil sleeve of FIG. 1 in the contracted state.
Figure 3:
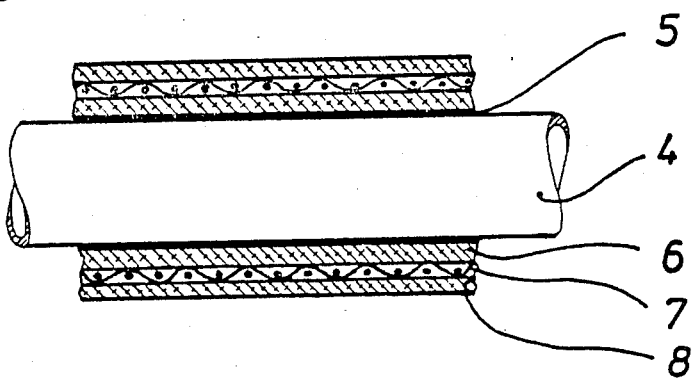
FIG. 3 is a view that shows a built-up hose blank.

Referring now to the drawing in detail, shown in all of the figures is a fabrication mandrel 4 that is expediently formed from a longer steel pipe. In the illustration of FIG. 1, a foil tube or sleeve 5, which has an inside diameter that is greater than the outer diameter of the fabrication mandrel 4, is loosely disposed about the latter. The foil sleeve 5, as a shrinkable or contractible article, for example of a polyamide or some other thermoplastic synthetic material, is produced by a blowing method. It is possible to have wall thicknesses of approximately 40 to 60 microns, and a maximum contraction of up to 35%. The fabrication mandrel 4, after being surrounded by the foil sleeve 5, is placed in a heating mechanism and is subjected to a defined temperature influence T (FIG. 2) under the influence of which the foil sleeve 5 contracts around the shape-giving mandrel 4 in such a way that the entire surface of the sleeve 5 rests smoothly against the mandrel. Thereafter, the actual hose itself can be built-up in a customary manner, which is indicated in FIG. 3 with an inner rubber layer 6, a reinforcement layer 7 and an outer rubber layer 8, although it is to be understood that there is no limitation on any particular type of hose. The subsequent vulcanization of the rubber layers simultaneously also results in the production of a secure bond with the foil sleeve 5.

The present invention is, of course, in no way restricted to the specific disclosure of the specification and drawing, but also encompasses any modifications within the scope of the appended claims.

What we claim is:

1. In a method of producing a hose of natural or synthetic rubber remaining entirely flexible throughout although coping with a problem of fold formation, whereby the hose has an inner core made of a foil of thermoplastic synthetic material that is resistant to solvent and that serves as an inner core lining without any influence upon said hose remaining flexible, with the method including the steps of disposing a foil sleeve on a fabrication mandrel, then building-up on said foil sleeve a hose blank, with or without reinforcement layer means, and subsequently vulcanizing said hose blank, which simultaneously produces a bond between said hose blank and said foil sleeve, the improvement comprising the step of using as said foil sleeve a contractible foil sleeve for fold-free positioning of the inner core lining that during said disposing step has a diameter which is greater than the outer diameter of said fabrication mandrel, and that after said vulcanizing step forms a hose inner core that necessarily is free of folds and has a smooth surface, and removing the mandrel from the formed hose after vulcanization.

2. A method according to claim 1, which includes the step of using a foil sleeve that has a thickness of from 20 to 100 microns.

3. A method according to claim 2, which includes the step, after said disposing step and prior to said building-up step, of subjecting said foil sleeve to high temperature to cause said foil sleeve to contract on said fabrication mandrel and provide said foil sleeve with a fold-free smooth surface.

* * * * *